United States Patent
Motoda

(10) Patent No.: US 11,536,799 B2
(45) Date of Patent: Dec. 27, 2022

(54) ELECTRONIC DEVICE, RADAR DEVICE AND RADAR CONTROL METHOD

(71) Applicant: RENESAS ELECTRONICS CORPORATION, Tokyo (JP)

(72) Inventor: Yuji Motoda, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 393 days.

(21) Appl. No.: 16/700,624

(22) Filed: Dec. 2, 2019

(65) Prior Publication Data

US 2020/0256947 A1 Aug. 13, 2020

(30) Foreign Application Priority Data

Dec. 26, 2018 (JP) .............................. JP2018-242717

(51) Int. Cl.
*G01S 7/03* (2006.01)
*H01Q 21/06* (2006.01)
(Continued)

(52) U.S. Cl.
CPC .............. *G01S 7/032* (2013.01); *G01S 7/352* (2013.01); *G01S 13/32* (2013.01); *H01Q 21/061* (2013.01)

(58) Field of Classification Search
CPC .. G01S 2013/0254; G01S 13/42; G01S 7/032; G01S 2013/0245; G01S 13/582;
(Continued)

(56) References Cited

U.S. PATENT DOCUMENTS 6,188,913 B1* 2/2001 Fukagawa .............. H01Q 21/29
342/359
10,371,796 B2* 8/2019 Kishigami ............ G01S 13/325
(Continued)

FOREIGN PATENT DOCUMENTS

JP 2015-132474 A 7/2015
JP 2016-045132 A 4/2016
(Continued)

OTHER PUBLICATIONS

Japanese Notice of Reasons for Refusal issued in corresponding Japanese Patent Application No. 2018-242717, dated May 17, 2022, with English translation.

*Primary Examiner* — Olumide Ajibade Akonai
(74) *Attorney, Agent, or Firm* — McDermott Will & Emery LLP

(57) ABSTRACT

An electronic device capable of reducing a process associated with a radar search is provided. The electronic device DEVa has a transmitting linear array antenna TXA, a receiving linear array antenna RXA, and a control circuit CTLU for controlling the transmitting linear array antenna TXA and the receiving linear array antenna RXA. The transmitting linear array antenna TXA includes a plurality of transmission antennas TXr[1] to TXr[4] arranged along the Z direction, and transmits a transmission wave. The receiving linear array antenna RXA includes a plurality of reception antennas RXr[1] to RXr[4] arranged along an X direction orthogonal to the Z direction, and receives a reflected wave of a transmission wave.

14 Claims, 16 Drawing Sheets

(51) Int. Cl.
  *G01S 7/35*  (2006.01)
  *G01S 13/32*  (2006.01)

(58) Field of Classification Search
  CPC ...... G01S 7/52019; G01S 13/04; G01S 13/91;
    G01S 7/03; G01S 13/343; G01S 13/90;
    G01S 7/282; H01Q 21/24; H01Q 21/08;
    H01Q 21/061; H01Q 21/065; H01Q
    21/0025; H01Q 21/00; H01Q 21/28;
    H01Q 25/00
  See application file for complete search history.

(56) References Cited

U.S. PATENT DOCUMENTS

| | | | |
|---|---|---|---|
| 10,749,258 B1* | 8/2020 | West | H04B 7/0617 |
| 2010/0141527 A1* | 6/2010 | Lalezari | H01Q 21/08 |
| | | | 342/368 |
| 2011/0279669 A1 | 11/2011 | Longstaff | |
| 2014/0125511 A1* | 5/2014 | Longstaff | G05D 1/0858 |
| | | | 342/33 |
| 2016/0131738 A1* | 5/2016 | Prechtel | G01S 13/426 |
| | | | 342/175 |
| 2018/0149736 A1* | 5/2018 | Alland | H01Q 21/28 |
| 2018/0159246 A1* | 6/2018 | Raphaeli | H01Q 21/061 |
| 2018/0166794 A1* | 6/2018 | Raphaeli | H01Q 21/28 |
| 2019/0137616 A1* | 5/2019 | Kishigami | G01S 13/42 |
| 2019/0302254 A1 | 10/2019 | Maruyama et al. | |

FOREIGN PATENT DOCUMENTS

| | | |
|---|---|---|
| WO | 2013/045232 A1 | 4/2013 |
| WO | 2018/122926 A1 | 7/2018 |

* cited by examiner

ELECTRONIC DEVICE, RADAR DEVICE AND RADAR CONTROL METHOD

CROSS-REFERENCE TO RELATED APPLICATIONS

The disclosure of Japanese Patent Application No. 2018-242717 filed on Dec. 26, 2018 including the specification, drawings and abstract is incorporated herein by reference in its entirety.

BACKGROUND

The present disclosure relates to an electronic device radar device and a radar control method, for example, an electronic device having a transmission linear array antenna and a receiving linear array antenna, a radar device and a radar control method.

THE BACKGROUND OF THE INVENTION

Japanese unexamined Patent Application publication No. 2016/45132 shows a weather radar device having a phased array antenna. The weather radar device controls the phased array antenna to form both a transmission beam having a wide beam width in the elevation direction and a narrow beam width in the azimuth direction, and a transmit beam having a wide beam width in the azimuth direction and a narrow beam width in the elevation direction. As a technique for creating virtual antennas and increasing the amount of transmitted data, MIMO (Multiple Input and Multiple Output) radar is known. The MIMO radar is a technique for creating further four virtual antennas by adding one transmitting antenna to a configuration including, for example, one antenna and four receiving antennas.

SUMMARY

For example, when a phased array antenna as shown in Japanese unexamined Patent Application publication No. 2016/45132 is used, the azimuth angle and elevation angle of a transmission wave or a reception wave can be changed electronically instead of mechanically. The resolution of the azimuth angle and the elevation angle at this time depends on the number of antennas. Therefore, in order to realize a high-resolution phased array antenna, a large number of antennas are required. As a result, an increase in cost or the like may occur.

The embodiments described below have been made in view of the above, and other problems and novel features will be apparent from the description of the present specification and the accompanying drawings.

An electronic device according to one embodiment includes a linear array antenna for transmission, a linear array antenna for reception, and control circuitry for controlling the linear array antenna for transmission and the linear array antenna for reception. The transmission linear array antenna includes a plurality of transmission antennas arranged along the first direction, and transmits a transmission wave. The reception linear array antenna includes a plurality of reception antennas arranged along a second direction orthogonal to the first direction, and receives a reflected wave of a transmission wave.

According to the above-mentioned embodiment, in the electronic device having the transmission linear array antenna and the receiving linear array antenna, the process associated with the radar search can be reduced.

DETAILED DESCRIPTION

Figure 1A:
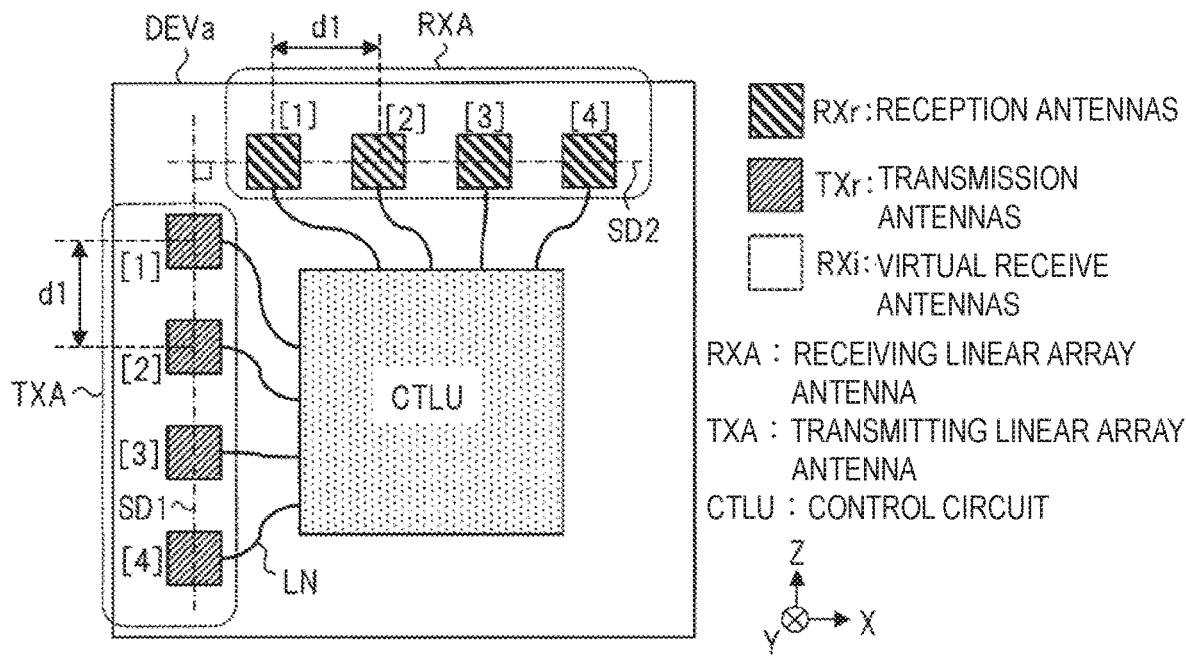
FIG. 1A is a plan view showing a schematic configuration example of an electronic device according to the present first embodiment.

In the following embodiments, when required for convenience, the description will be made by dividing into a plurality of sections or embodiments, but except when specifically stated, they are not independent of each other, and one of them is related to modified example, detail, supplementary description, or the like of part or all of the other. In the following embodiments, the number of elements or the like (including the number, number, quantity, range, and the like) is not limited to the specific number except the case where it is specified in particular or the case where it is obviously limited to the specific number in principle, and may be a specific number or more or less.

Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments of the present invention are described in detail with reference to the drawings. In all the drawings for explaining the embodiments, the same members are denoted by the same reference numerals in principle, and repetitive descriptions thereof are omitted.

Figure 1B:
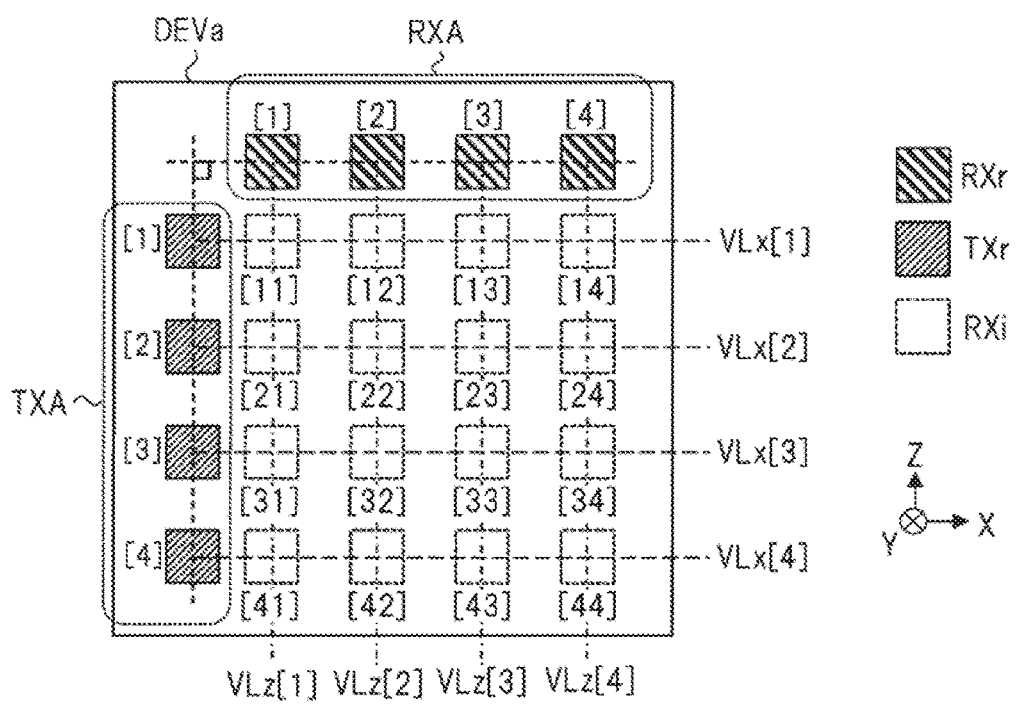
FIG. 1B is a plan view showing an equivalent configuration example of FIG. 1A.

FIG. 1A is a plan view showing a schematic configuration example of an electronic device according to the present first embodiment, and FIG. 1B is a plan view showing an equivalent configuration example of FIG. 1A. The electronic device DEVa shown in FIG. 1A is, for example, a radar device, and includes a transmitting linear array antenna TXA, a receiving linear array antenna RXA, and a control circuit CTLU. In the specification, the X, Y, and Z directions are used to explain the positional relationship. The Z direction is a direction orthogonal to the X direction, and the Y direction is a direction orthogonal to the X direction and the Z direction.

The transmission linear array antenna TXA includes a plurality of (in this example, four) transmission antennas TXr[1] to TXr[4] arranged in order along the Z direction. The reception linear array antenna RXA includes a plurality of (in this example, four) reception antennas RXr[1] to RXr[4] arranged in order along the X direction. In other words, the transmission linear array antenna TXA is arranged on the first side SD1, which is one of the four sides forming the rectangle, and the receiving linear array antenna RXA is arranged on the second side SD2, which is the other side perpendicular to the first side SD1. The transmission linear array antenna TXA transmits a transmission wave toward a target object (not shown), and the reception linear array antenna RXA receives a reflection wave (reception wave) of the transmission wave (for example, a reflection wave from the target object). That is, the transmission linear array antenna TXA and the reception linear array antenna RXA are not antennas for both transmission and reception.

The control circuit CTLU is coupled to each of the transmission antennas TXr[1] to TXr[4] and the reception antennas RXr[1] to RXr[4] via the wiring LN, and controls the transmission linear array antenna TXA and the reception linear array antenna RXA. Specifically, the control circuitry CTLU electronically controls the orientation of the transmitting linear array antenna TXA and the orientation of the receiving linear array antenna RXA. At this time, the control circuit CTLU controls the phases of the respective transmission waves transmitted from the transmission antennas TXr[1] to TXr[4], thereby controlling the elevation angle in the YZ plane as the direction of the transmission linear array antenna TXA. The control circuit CTLU controls the phase of each of the received waves (reflected waves) received by the reception antennas RXr[1] to RXr[4], thereby controlling the azimuth angle in the XY plane as the direction of the receiving linear array antenna RXA.

In this example, the transmission antennas TXr[1] to TXr[4] are arranged at a distance d1 along the Z direction, and the reception antennas RXr[1] to RXr[4] are also arranged at a distance d1 along the X direction. The distance d1 is typically set to "$\lambda/2$" or the like by using the wavelength $\lambda$ of the transmission wave to be used. The transmission wave is typically a millimeter wave (a frequency band of 30 to 300 GHz) or a quasi-millimeter wave (a frequency band of 20 to 30 GHz) including a frequency band of 24 GHz (wavelength $\lambda$ 12.5 mm) or 79 GHz (wavelength $\lambda \approx 0.3.8$ mm), but is not particularly limited thereto.

Here, the electronic device DEVa is formed on a single semiconductor chip (semiconductor device) such as, for example, MMIC (Monolithic Microwave Integrated Circuit for small size and high speed. However, the present invention is not necessarily limited thereto, and in some cases, the control circuit CTLU may be formed on a single semiconductor chip, and the semiconductor chip and the transmitting linear array antenna TXA and the receiving linear array antenna RXA may be mounted on a wiring board. Alternatively, the control circuit CTLU may be configured by combining a plurality of semiconductor chips.

Figure 4:
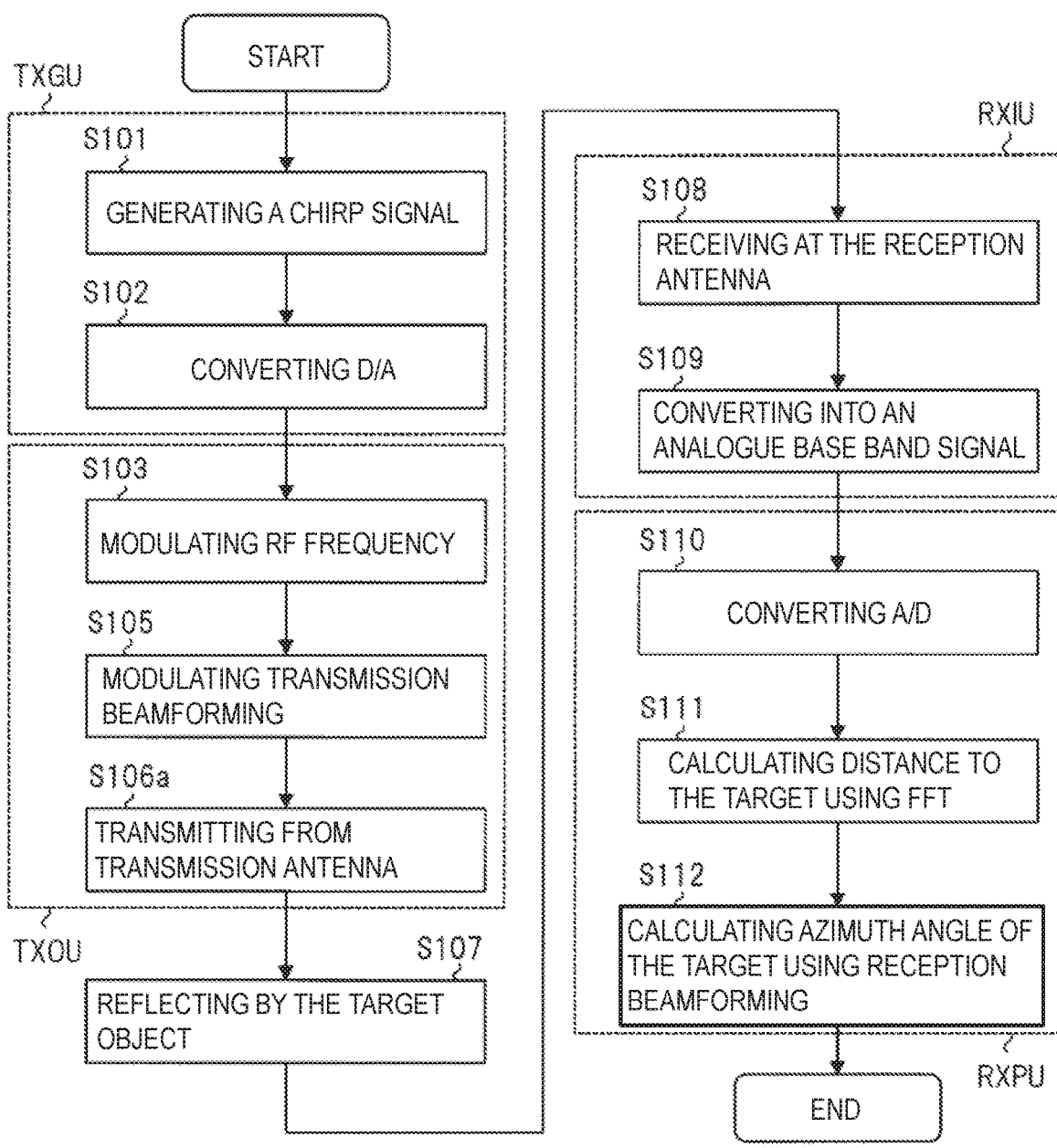
FIG. 4 is a flow chart showing an example of processing contents of the control circuit of FIG. 2 when the antenna arrangement of FIGS. 1A and 1B is used.

When the transmitting linear array antenna TXA and the receiving linear array antenna RXA arranged in such a perpendicular arrangement are used, as shown in FIG. 1B, 4×4 virtual receiving antennas (called virtual receiving antennas) RXi[mn] (each of m and n is an integer of 1 to 4) are created by the art of the MIMO radar. The virtual reception antennas RXi[mn] are arranged at respective intersections of coordinates of the plurality of transmission antennas TXr[1] to TXr[4] in the Z direction and coordinates of the plurality of reception antennas RXr[1] to RXr[4] in the X direction.

That is, the virtual reception antenna RXi[mn] is created at a position where the virtual line VLx[m] and the virtual line VLz[n] intersect. The virtual line VLx[m] is a line that passes through the transmission antenna TXr[m] which is one of the plurality of transmission antennas TXr[1] to TXr[4], and extends along the X direction. The virtual line VLz[n] is a line that passes through the reception antenna RXr[n] which is one of the plurality of reception antennas RXr[1] to RXr[4], and extends along the Z direction.

In this embodiment, the transmitting linear array antenna TXA and the receiving linear array antenna RXA are not arranged at the point of intersection of the first side SD1 and the second side SD2, but are arranged at locations other than the intersection. However, in some cases, for example, a configuration may be employed in which the transmitting linear array antenna TXA or the receiving linear array antenna RXA is arranged at the point of intersection. In the specification, a plurality of transmit antennas are collectively referred to as transmission antennas TXr, a plurality of receive antennas are collectively referred to as reception antennas RXr, and a plurality of virtual receive antennas are collectively referred to as virtual receive antennas RXi.

Figure 2:
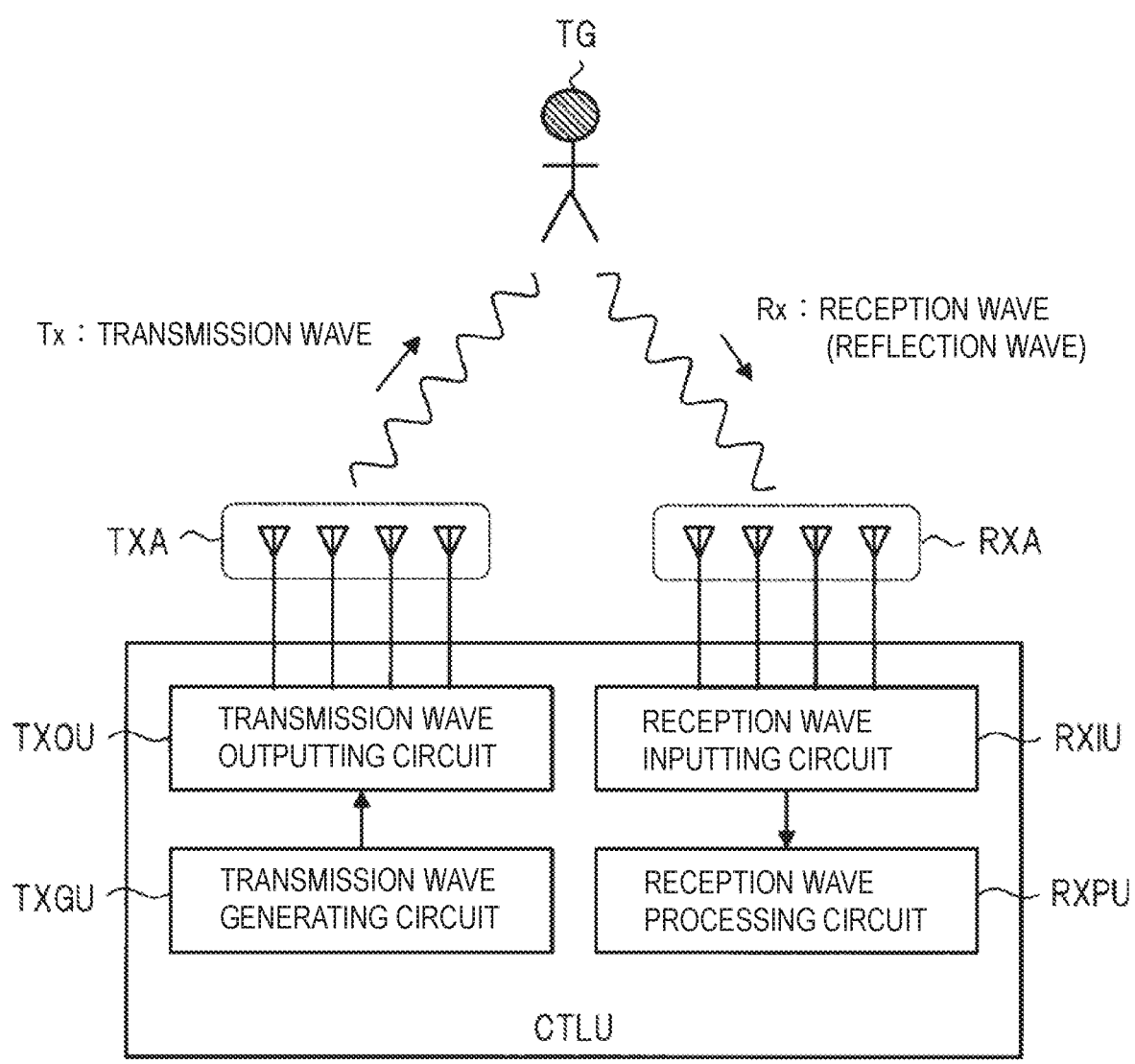
FIG. 2 is a schematic diagram showing a configuration example of a control circuit in FIG. 1.

FIG. 2 is a schematic diagram showing a configuration example of the control circuit in FIG. 1A. As shown in FIG. 2, the control circuit CTLU includes a transmission wave generating circuit TXGU, a transmission wave outputting circuit TXOU, a reception wave inputting circuit RXIU, and a reception wave processing circuit RXPU. The transmission wave generating circuit TXGU generates, for example, a transmission wave Tx of a base band in FMCW (Frequency Modulated Continuous Wave) system. The transmission wave outputting circuit TXOU up-converts the generated base band transmission wave Tx to a predetermined frequency band, and then transmits the baseband transmission wave Tx to the transmitting linear array antenna TXA, and controls the direction of the transmitting linear array antenna TXA at this time (transmission beamforming) and the like.

The reception wave inputting circuit RXIU receives a reflection wave (reception wave) Rx from the target TG corresponding to the transmission wave Tx, and down-converts the reception wave Rx to a base band. The reception wave processing circuit RXPU calculates the position of the target TG based on the base band reception wave Rx. The calculation processing of the position includes the calculation processing of the distance to the target TG, the calculation processing of the azimuth angle in which the target TG exists (reception beam forming), and the like.

<Summary of a Linear Antenna>

Figure 11:
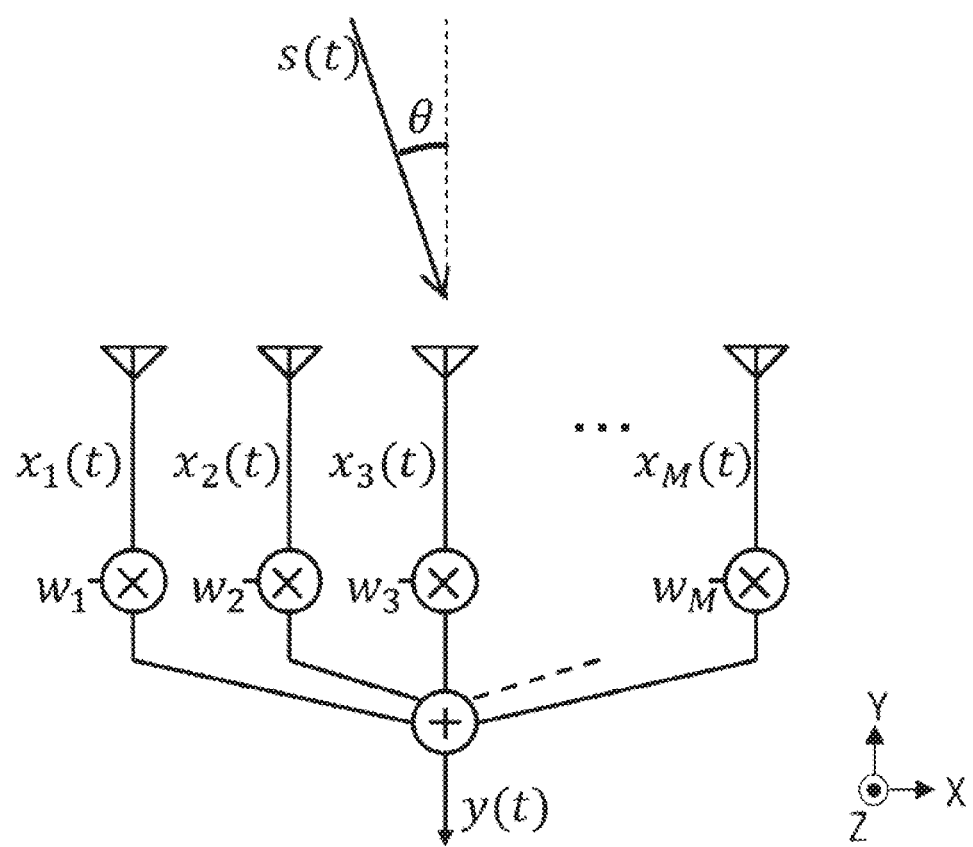
FIG. 11 is a schematic diagram showing an example of an operation principle of a linear array antenna.

Prior to a detailed explanation of the operation of the electronic device DEVa shown in FIG. 1A, a linear array antenna, which is one of the phased array antennas, will be briefly explained. FIG. 11 is a schematic diagram showing an example of the operation principle of the linear array antenna. As shown in FIG. 11, the linear array antenna is formed by arranging a plurality of antennas on a straight line, in this example, in the X direction. The plurality of antennas receive reflected waves (S(t)) from the target in accordance with the transmitted waves.

At this time, the azimuth angle θ of the antenna can be changed electronically, not physically, by appropriately weighting ($w_1$ to $w_M$) the received signals ($x_1(t)$ to $x_M(t)$) of the plurality of antennas (as a result, controlling the phases equivalently) and then generating the combined signal (y(t)). That is, the directivity of the antenna can be obtained electronically in the XY plane. However, the directivity of the antenna cannot be obtained in the YZ plane.

Figure 12:
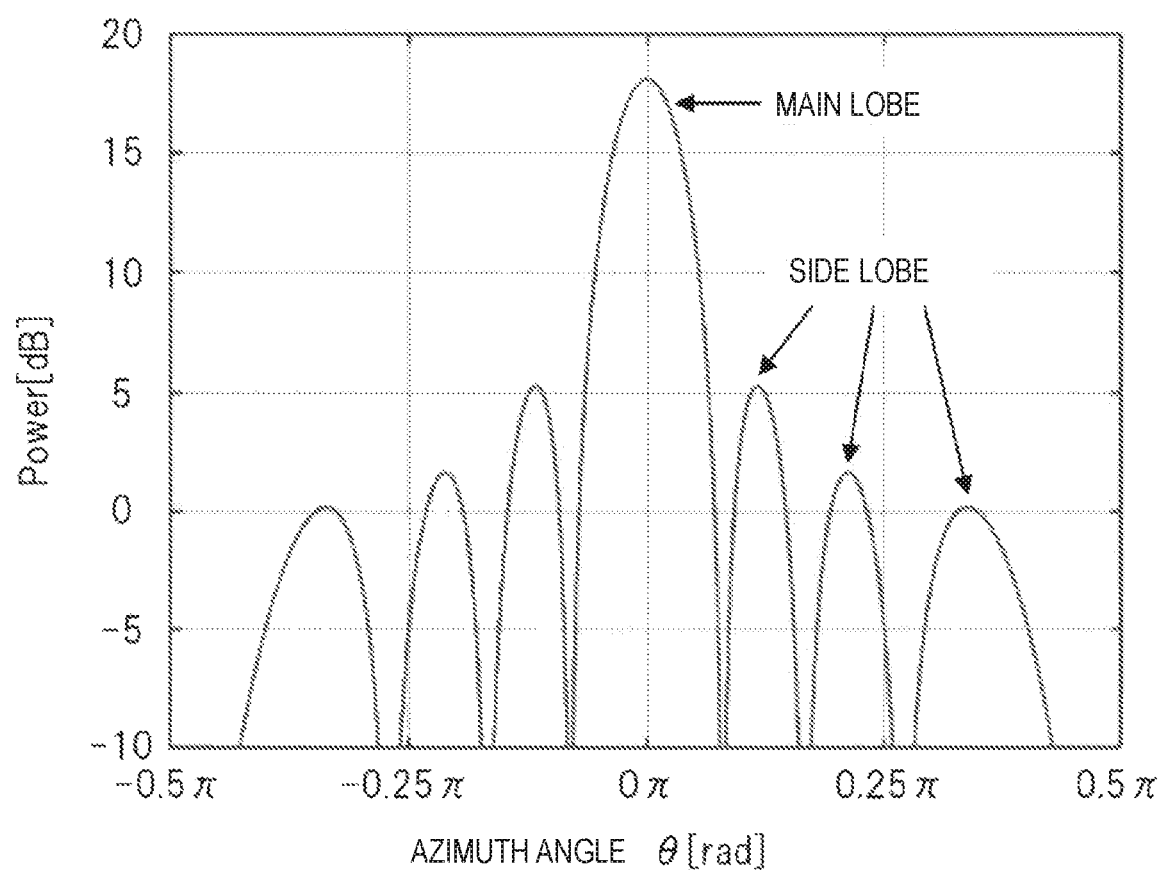
FIG. 12 is a diagram showing an example of characteristics of the linear array antenna of FIG. 11.

FIG. 12 is a diagram showing an example of characteristics of the linear array antenna of FIG. 11. FIG. 12 shows a result of simulating directivity when eight antennas are arranged at equal intervals (here, "λ/2" intervals) as shown in FIG. 11 (when M=8) and the weighting ($w_1$ to $w_M$) does not differ. In FIG. 12, the maximum gain is obtained when the azimuth angle θ is 0 [rad]. The peak containing this maximum gain is called the main lobe. The reflected wave (S(t)) from the target object is received with high sensitivity at the azimuth angle θ of the main lobe, and is received with low sensitivity at the other azimuth angles. Therefore, the antenna is substantially oriented at the azimuth angle θ of the main lobe.

The azimuth angle θ of the main lobe can be appropriately controlled by appropriately providing differences in the weighting ($w_1$ to $w_M$) shown in FIG. 11. In addition, in FIG. 12, for example, a mountain also occurs at a place where the azimuth angle θ is about 0.37π [rad] or the like. These peaks are gains generated at azimuth angles θ different from the original ones, and are called side lobes. Generally, if the number of antennas is increased, the gain of the side lobe can be reduced, and the width of the azimuth angle θ of the main lobe can be narrowed. As a result, the resolution of the azimuth angle θ can be enhanced. In FIGS. 11 and 12, the directivity of the receiving side has been described, but the directivity can be given to the transmitting side in the same manner.

Figure 13A:
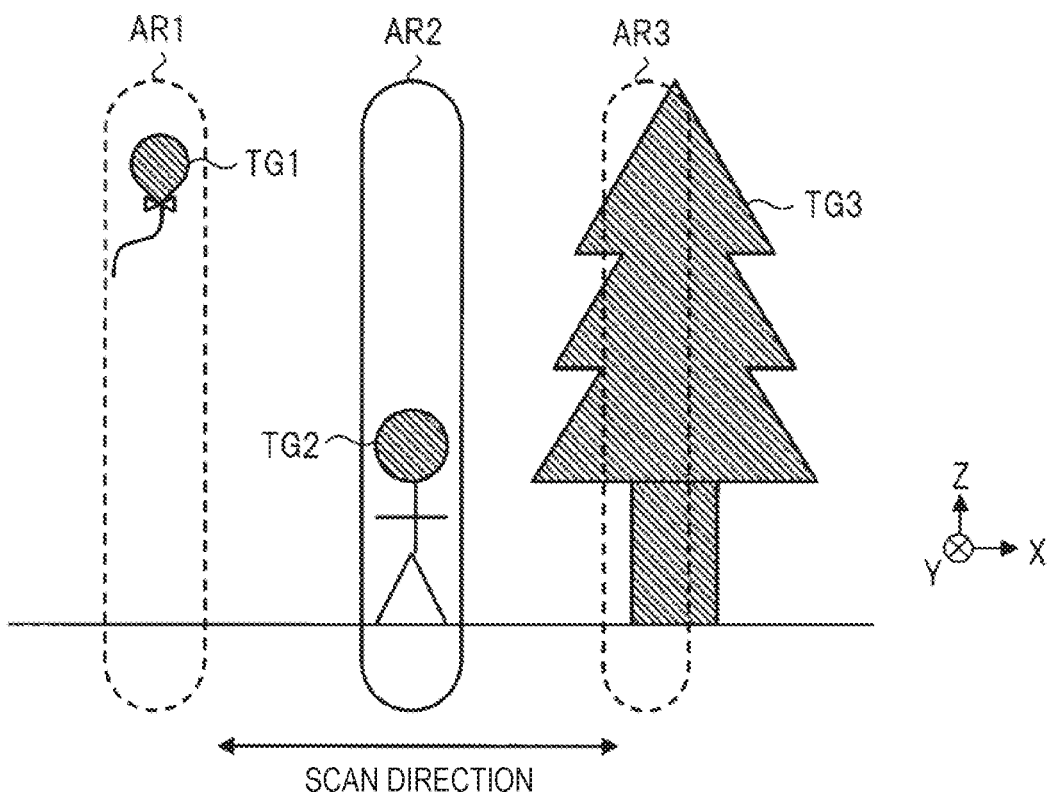
FIG. 13A is a diagram showing an example of an environment in which a radar search is performed using the linear array antenna of FIG. 11.
Figure 13B:
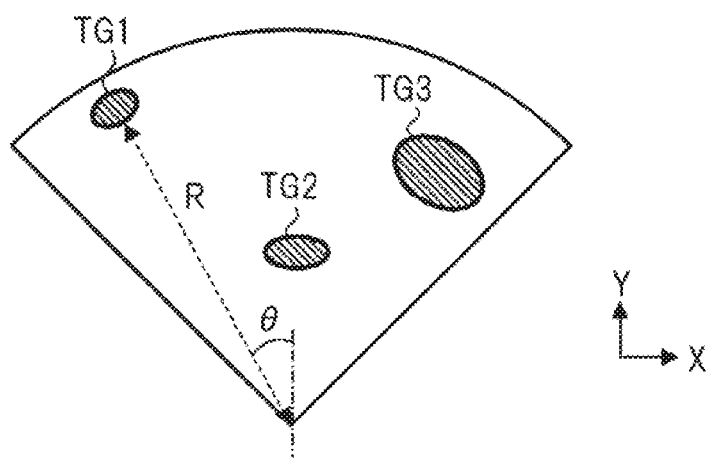
FIG. 13B is a diagram showing an example of a radar search result in FIG. 13A.

FIG. 13A is a diagram showing an example of an environment in which a radar search is performed using the linear array antenna of FIG. 11, and FIG. 13B is a diagram showing an example of a radar search result in FIG. 13A. In FIG. 13A, the targets TG1-TG3 exist at different coordinates in the X-direction. In FIG. 13A, the linear array antennas of FIG. 11 are arranged such that the antennas are aligned in the X direction. In this condition, as described above, the linear array antenna of FIG. 11 performs the radar search while scanning in the XY plane as shown in FIG. 13A by sequentially changing the azimuth angle of the XY plane using the weighting ($w_1$ to $w_M$).

As a result, as shown in FIG. 13B, in the X-Y plane, information on the azimuth angle θ in which each target TG1-TG3 (e.g., TG1) exists and information on the distances R to each target TG1-TG3 (e.g., TG1) are obtained. However, the position on the YZ-plane (i.e., the elevation angle) of the target TG1-TG3 is not obtained. That is, as shown in FIG. 13A, the target objects TG1-TG3 are respectively arranged at different YZ coordinates (i.e., elevation angles) in the region AR1~AR3 which is the YZ plane, but as shown in FIG. 13B, the information of the YZ coordinates is degenerate to the XY plane.

Figure 14:
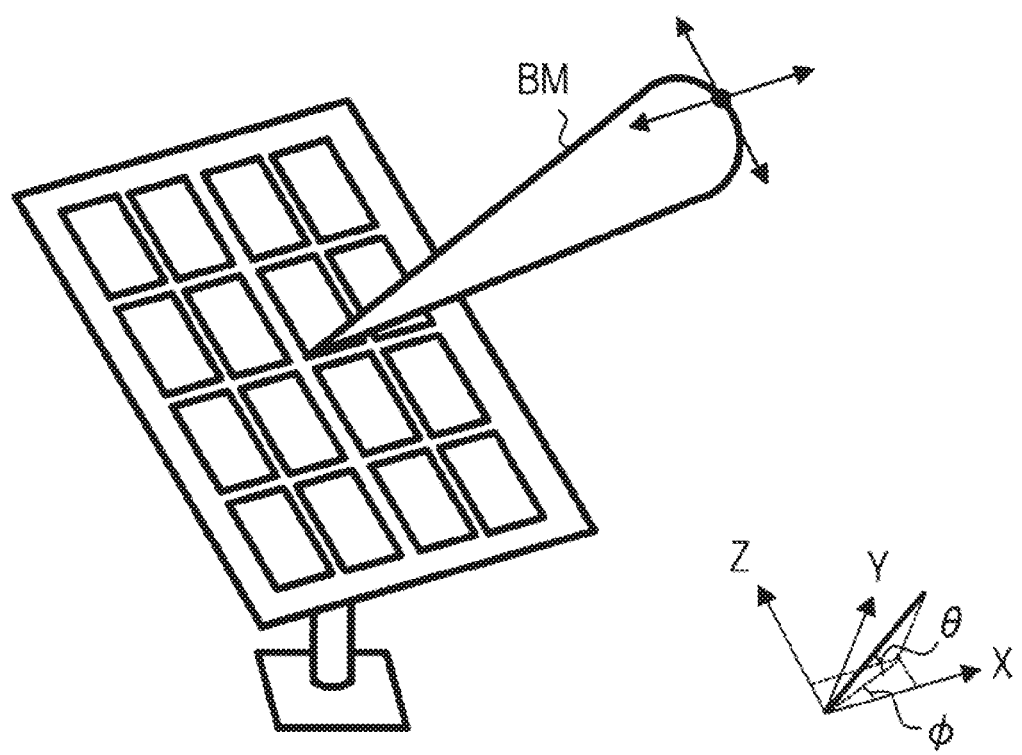
FIG. 14 is a schematic diagram showing a configuration example of a planar array antenna obtained by two-dimensionally expanding the linear array antenna of FIG. 11.

FIG. 14 is a schematic diagram showing a configuration example of a planar array antenna obtained by two-dimensionally expanding the linear array antenna of FIG. 11. By expanding the linear array antenna of FIG. 11 in two dimensions (for example, by arranging each antenna in a matrix shape in the XZ plane), it becomes possible to control the direction of the beam BM in three dimensions as shown in FIG. 14. That is, the azimuth angle θ in the XY plane and the elevation angle φ in the YZ plane can be controlled.

<Summary and Problems of Electronic Device (Comparative Example)>

Figure 15A:
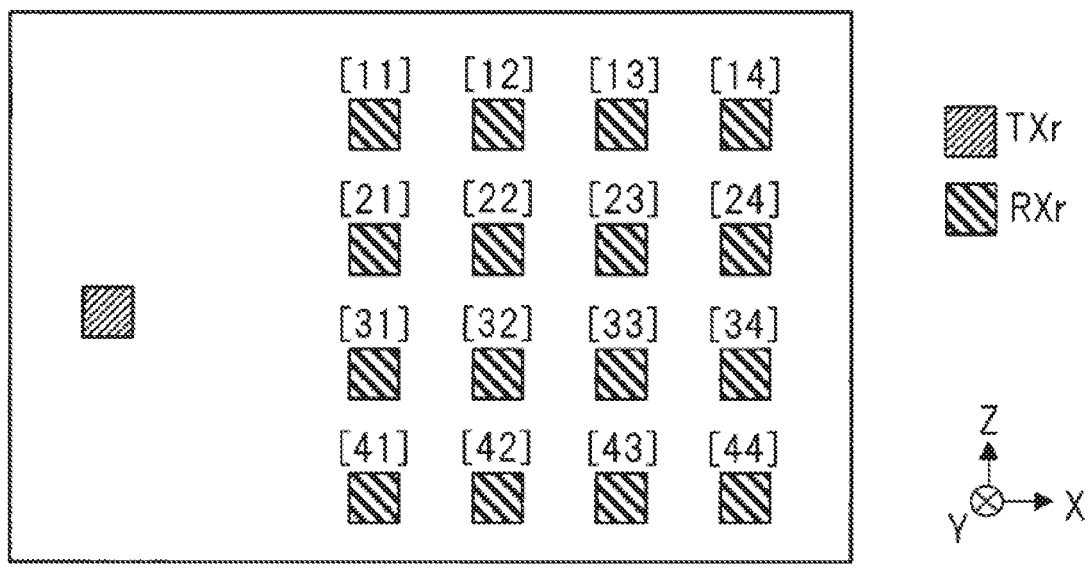
FIG. 15A is a plan view showing an arrangement configuration example of an antenna in an electronic device as a first comparative example of the present invention.
Figure 15B:
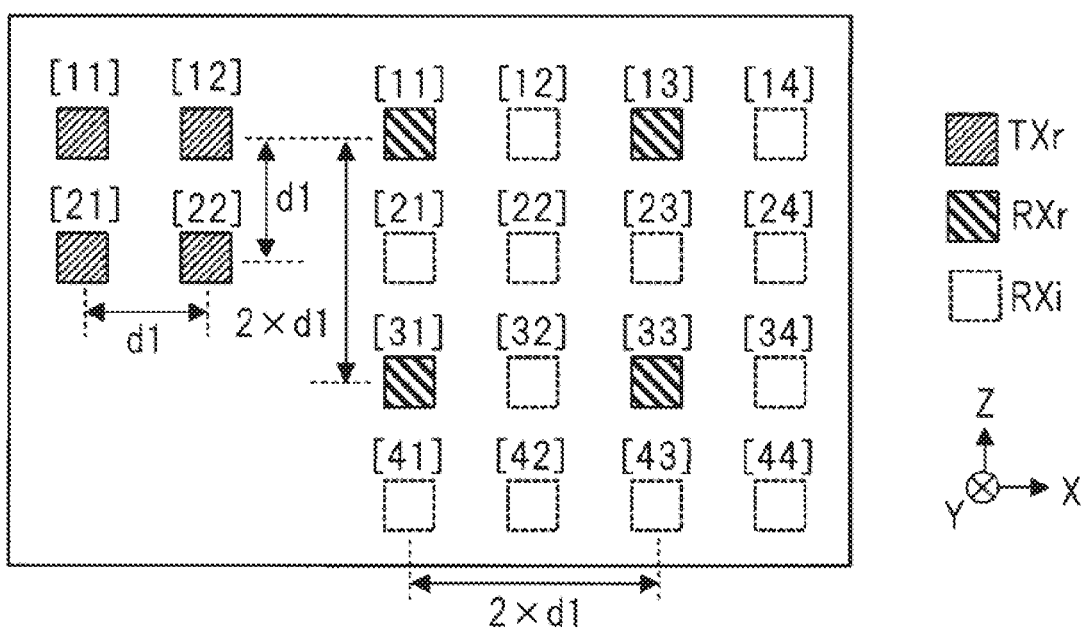
FIG. 15B is a plan view showing an arrangement configuration example of an antenna in an electronic device as a second comparative example of the present invention.

FIG. 15A is a plan view showing an arrangement configuration example of an antenna in an electronic device as a first comparative example of the present invention, and FIG. 15B is a plan view showing an arrangement configuration example of an antenna in an electronic device as a second comparative example of the present invention. FIG. 15A shows a planar array antenna with one transmission antenna TXr and "4×4" reception antennas RXr[mn] (each of m and n is an integer of 1 to 4). The reception antennas RXr[mn] are arranged in a matrix in the XZ plane. Using such a configuration example, it is possible to control the directivity of the beam in three dimensions. However, since the number of antennas increases, an increase in cost or the like may occur.

Therefore, it is conceivable to use a configuration as shown in FIG. 15B. In FIG. 15B, four transmission antennas TXr[11], [12], [21], [22] and four reception antennas RXr [11], [13], [31], [33] are arranged. The four transmission antennas TXr are arranged in a matrix at a distance d1 in the XZ plane. On the other hand, the four reception antennas RXr are arranged in a matrix at intervals of "2×d1" in the XZ plane.

In MIMO radars, a plurality of transmission antennas and a plurality of reception antennas are usually arranged in the same direction. Therefore, in the example of FIG. 15B the four transmission antennas TXr and the four reception antennas RXr are arranged side by side in the same direction (in this case, the X direction). Using such an example configuration, three virtual reception antennas (RXi[12], [21], [22]) are created around each of the four reception antennas RXr (e.g., RXr[11]). As a result, a configuration equivalent to the case of FIG. 15A can be realized by using a total of 8 antennas.

Figure 16:
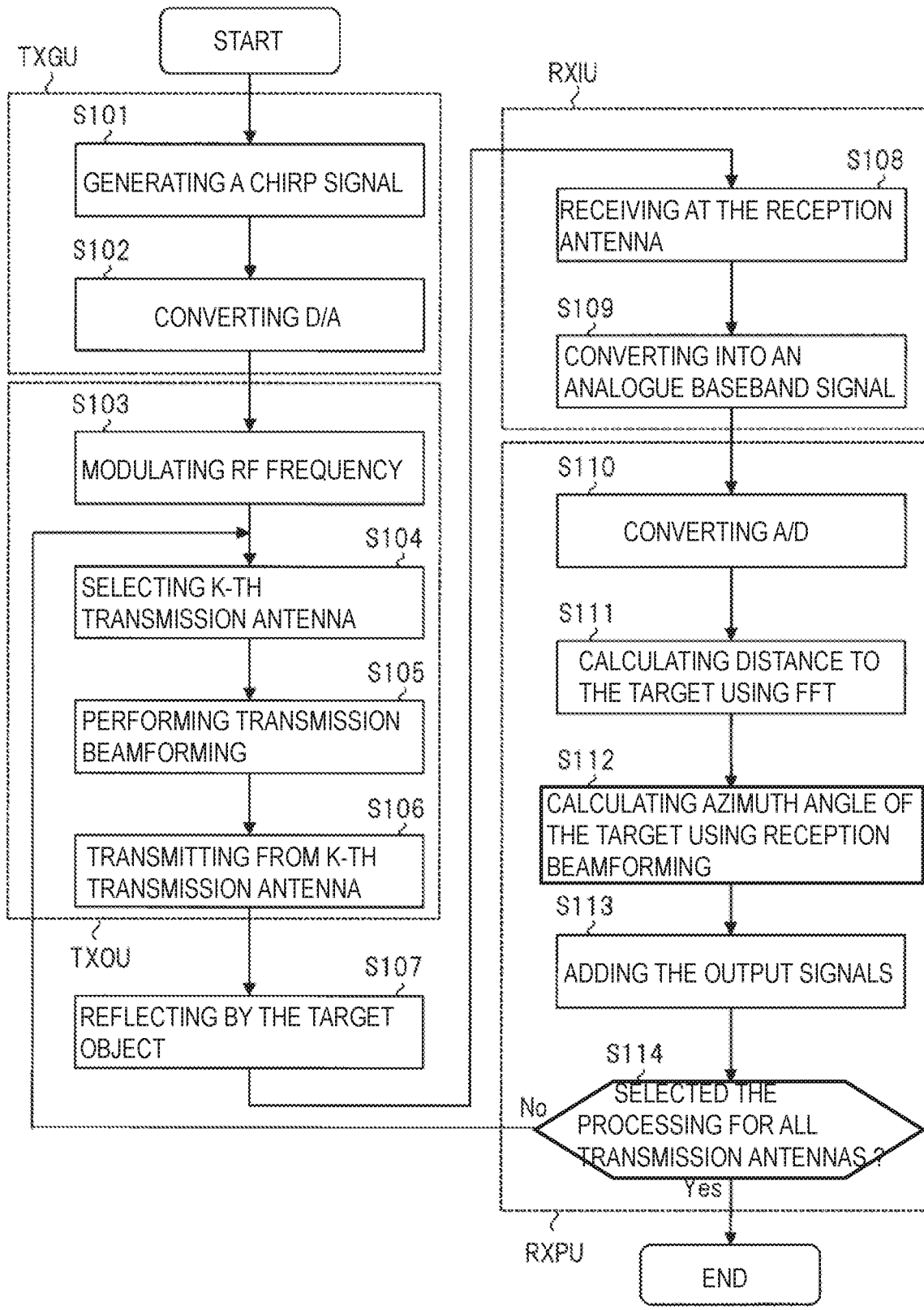
FIG. 16 is a flowchart showing an example of processing contents of the control circuit of FIG. 2 when the antenna arrangement of FIG. 15B is used.

FIG. 16 is a flowchart showing an example of processing contents of the control circuit of FIG. 2 when the antenna arrangement of FIG. 15B is used. In this example, the radar search is performed using the FMCW method as an example, but other methods may be used. In FIG. 16, first, the transmission wave generating circuit TXGU generates a chirp signal which is a digital base band signal (step S101), and converts the chirp signal into an analogue signal (step S102).

Next, the transmission wave output circuit TXOU modulates a local signal having a predetermined frequency (e.g., 79 GHz) based on the analog-converted chirp signal to generate a transmission wave in a high frequency band (RF band) (step S103). Subsequently, the transmission wave outputting circuit TXOU selects the k-th transmission antenna TXr (step S104), performs transmission beam forming as required (S105), and then causes the selected transmission antenna TXr to transmit the transmission wave generated in step S103 (step S106). The transmitted wave is reflected by the target object, and a reflected wave (received wave) is generated in association with the reflected wave (step S107).

The reception wave inputting circuit RXIU receives the reflected wave (reception wave) at the reception antenna RXr (step S108), and converts the received wave into an analogue base band signal (step S109). The reception wave processing circuit RXPU converts the analog baseband signal into a digital signal (step S110), and calculates the position of the target object for the digital baseband signal. Specifically, the reception wave processing circuit RXPU calculates distances to the target using, for example, FFTs (Fast Fourier Transform) (step S111), and calculates azimuth angles of the target using reception beamforming (step S112).

Thereafter, the reception wave processing circuit RXPU returns to the step S104 and sequentially adds the output signals obtained by the calculation processing of the step S112 while sequentially changing the transmission antennas TXr to be selected (step S113, S114). In step S114, the reception wave processing circuit RXPU repeats the processing of step S104-S113 until all the transmission antennas TXr are selected (step S114). Through these processes, for example, a result corresponding to the case where the position of a certain target is detected using 16 reception antennas RXr can be obtained.

As described above, when the antenna arrangement as shown in FIG. 15B is used, the radar search needs to be performed while the selected transmission antenna TXr is changed in a time division manner (step S104, S114 in FIG. 16). For example, at least the transmission wave from the transmission antenna TXr[11] and the transmission wave from the transmission antenna TXr[12] in FIG. 15B need to satisfy an orthogonal relationship (a relationship in which signals can be distinguished without correlation with each other). In the example of FIG. 16, time division is used to obtain this orthogonal relationship. However, the orthogonal relationship is not limited to time division, and can be realized by, for example, coding (code division).

However, when time division is used, the processing time (time required for radar search) increases as the number of transmission antennas TXr increases. In addition, processing loads increase with the processing of the S113 of steps shown in FIG. 16, and the reservation of buffers and the like are also required. On the other hand, if encoding or the like is used, an increase in processing time can be suppressed, but an increase in processing load or the like may occur due to encoding at the time of transmission and decoding at the time of reception.

As described above, when the antenna arrangement as shown in FIG. 15B is used, the number of antennas can be reduced as compared with the case of FIG. 15A, but processing for distinguishing which of the transmitted waves from the plurality of transmission antennas TXr reflections to is necessary, so that there is a possibility that an increase in processing accompanied by radar search may occur. In addition, since the power of the transmitted wave is determined by the selected transmission antenna TXr rather than by all transmission antennas TXr, a decrease in the S/N ratio may occur.

First Embodiment

<Operation of Electronic device>

Figure 3A:
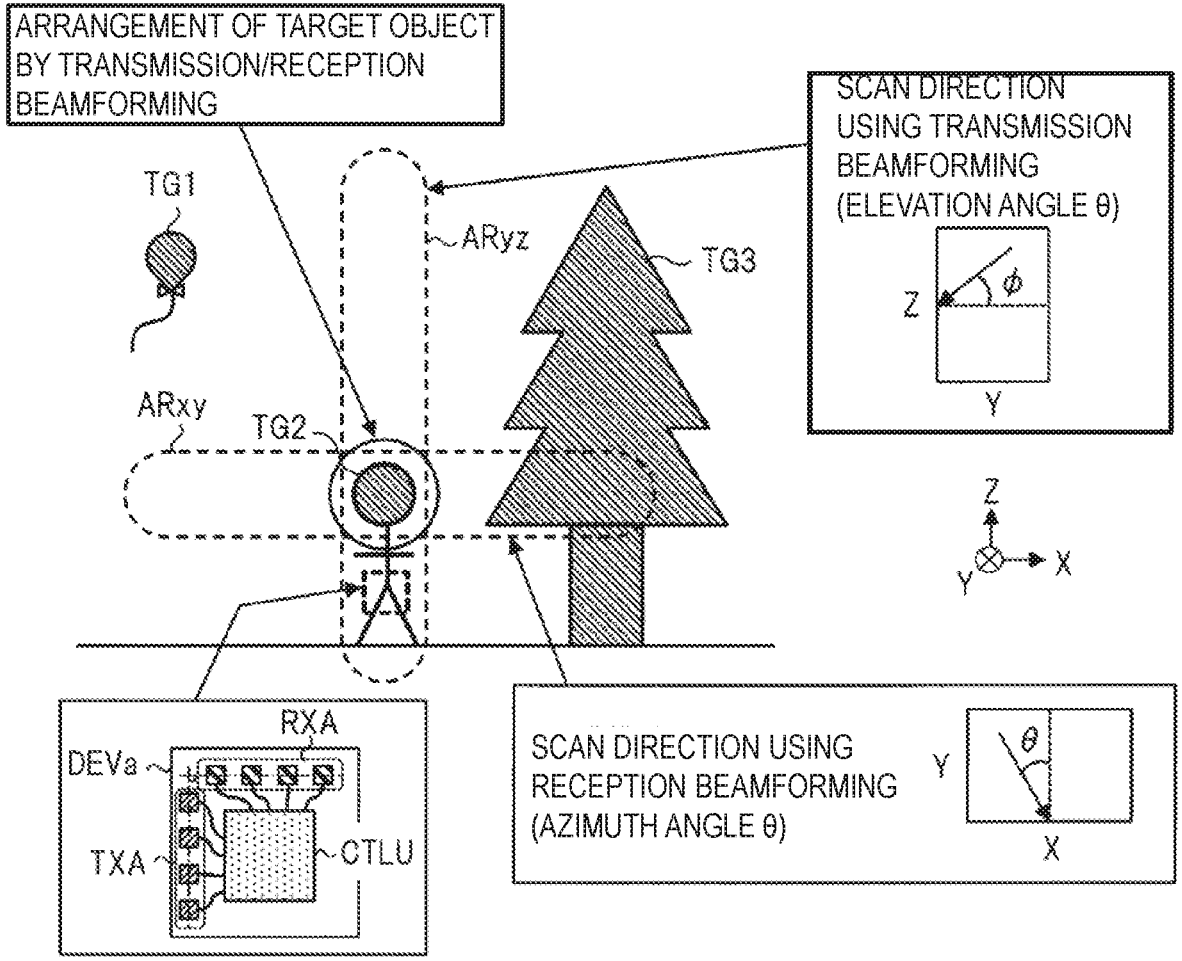
FIGS. 3A and 3B are conceptual diagrams illustrating examples of effects associated with perpendicular arrangement of antennas in the electronic device of FIGS. 1A and 1B.
Figure 3B:
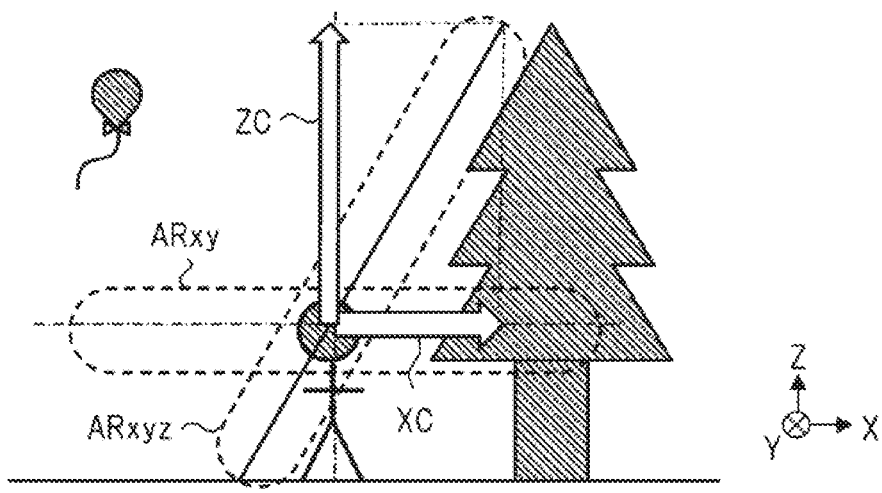

FIGS. 3A and 3B are conceptual diagrams illustrating examples of effects associated with perpendicular arrangement of antennas in the electronic device of FIGS. 1A and 1B. As shown in FIGS. 1A and 1B, when the transmitting linear array antenna TXA and the receiving linear array antenna RXA are arranged so as to be perpendicular to each other, the control circuit CTLU of FIG. 2 can perform the calculation process of the position of the target without distinguishing the reflected wave (received wave) corresponding to the transmission wave, unlike the control of FIG. 16.

This will be conceptually described with reference to FIGS. 3A and 3B. In FIG. 3A, radar exploration is performed using the electronic device (radar device) DEVa of FIG. 1A in the same environmental as in FIG. 13A. The transmitting linear array antenna TXA is arranged along the Z direction, and the receiving linear array antenna RXA is arranged along the X direction. In this instance, transmission beamforming using the transmitting linear array antenna TXA performs scanning in the Y-Z plane in the elevation angle φ direction as shown in the region ARyz. The directional component associated with this scan includes a component in the YZ direction and does not include a component in the X direction.

On the other hand, in the reception beamforming using the receiving linear array antenna RXA, scanning in the azimuth angle C direction in the XY plane is performed as shown in the region ARxy. The directional component associated with this scan includes a component in the XY direction and does not include a component in the Z direction. Therefore, the transmission beamforming using the transmitting linear array antenna TXA and the reception beamforming using the receiving linear array antenna RXA can be performed independently without interfering with each other. As a result, the discrimination processing such as the time division and the coding (code division) described above becomes unnecessary.

If the transmitting linear array antenna TXA and the receiving linear array antenna RXA are not orthogonally arranged, for example, as shown in the region ARxyz of FIG. 3B, the directional component accompanying the transmission beamforming includes the component XC in the same X direction as the reception beamforming. In this case, since the transmission beamforming and the reception beamforming interfere with each other, the discrimination processing such as the above-described time division and coding (code division) is necessary.

As a specific example, in FIG. 15B, it is assumed that the reception antenna RXr[11] receives a reflection wave from the azimuth angle θ in accordance with a transmission wave from the transmission antenna TXr[11], and the reception antenna RXr[11] receives a reflected wave from the azimuth angle θ in accordance with a transmission wave from the transmission antenna TXr[12]. This is equivalent to the case where both the reception antenna RXr[11] and the virtual reception antenna RXi[12] receive the reflected wave from the azimuth angle θ.

The reflected wave from the azimuth angle θ received by the reception antenna RXr[11] and the reflected wave from the azimuth angle θ received by the virtual reception antenna RXi[12] are different in phase due to the difference in coordinates in the X direction between the two antennas. Specifically, a phase difference corresponding to a distance of "d1×sin θ" is generated. Therefore, if the two reflected waves are combined as they are, the relationship becomes indistinguishable. Therefore, discrimination processing such as time division and coding (code division) is necessary.

On the other hand, in FIG. 1B, it is assumed that the reception antenna RXr[1] receives the reflection wave from the azimuth angle θ in response to the transmission wave from the transmission antenna TXr[1], and the reception antenna RXr[1] receives the reflected wave from the azimuth angle θ in response to the transmission wave from the transmission antenna TXr[2]. This is equivalent to the case where both the virtual reception antenna RXi[11] and the virtual reception antenna RXi[21] receive the reflected wave from the azimuth angle θ.

The reflected wave from the azimuth angle θ received by the virtual reception antenna RXi[11] and the reflected wave from the azimuth angle θ received by the virtual reception antenna RXi[21] have the same phase because the coordinates in the X direction of both antennas are the same. Therefore, it is not necessary to distinguish two reflection waves, and two reflected waves can be synthesized. As a result, the discrimination processing described above becomes unnecessary, and the transmission antenna TXr[1] and the transmission antenna TXr[2] can transmit the transmission wave in the overlapping period. Then, since the azimuth angle θ is equivalently determined using the two reception antennas RXi[11] and RXi[21], the resolution of the azimuth angle θ is also enhanced.

More specifically, for example, the transmission wave (Tx[1]) and the transmission wave (Tx[2]) transmitted from the transmission antenna TXr[1] and the transmission antenna TXr[2] in overlapping periods are different in phase by using a phase shifter or the like, and accordingly, the directivity in the elevation angle φ direction is added. Ideally, the two transmission waves arrive at the target object existing at the elevation angle φ and the azimuth angle θ without a phase difference, and accordingly, the virtual reception antennas RXi[11] and RXi[21] receive the reflection waves from the target object without a phase difference. Although the relationship between the two transmission antennas TXr and the two reception antennas RXr has been described here for convenience, the relationship between the four transmission antennas TXr and the four reception antennas RXr is the same.

Here, as shown in FIG. 1A, for example, the transmission antennas TXr[1] to TXr[4] are ideally arranged on the Z-axis. However, in practice, if the distance between the Z axis and the center position of each of the transmission antennas TXr[1] to TXr[4] is small enough with respect to the wavelength A, an error occurs in the position calculation by the distance, but a sufficient effect can be obtained. Also, with respect to the orthogonal arrangement of the transmitting linear array antenna TXA and the receiving linear array antenna RXA, a certain degree of arrangement variation is allowed in accordance with the accuracy of the allowed position calculation.

FIG. 4 is a flow chart showing an example of processing contents of the control circuit of FIG. 2 when the antenna arrangement of FIGS. 1A and 1B is used. In the processing flow shown in FIG. 4, compared with the processing flow shown in FIG. 16, the processing of the steps S104 and S114 in FIG. 16 (processing for sequentially selecting the transmission antenna TXr) and the processing of the step S113 (processing for adding the output signals obtained for each transmission antenna TXr) are deleted. In the step S106a of FIG. 4, unlike the step S106 of FIG. 16, the transmitting antennas TXr are not distinguished from each other.

As described above, when the electronic device DEVa of FIGS. 1A and 1B is used, the plurality of transmission antennas TXr[1] to TXr[4] can transmit transmission waves in overlapping periods. Then, the control circuit CTLU can calculate the position of the target without distinguishing which of the transmitted waves corresponds to the reflected waves received by the plurality of reception antennas RXr[1] to RXr[4].

<Details of a Control Circuit>

Figure 5:
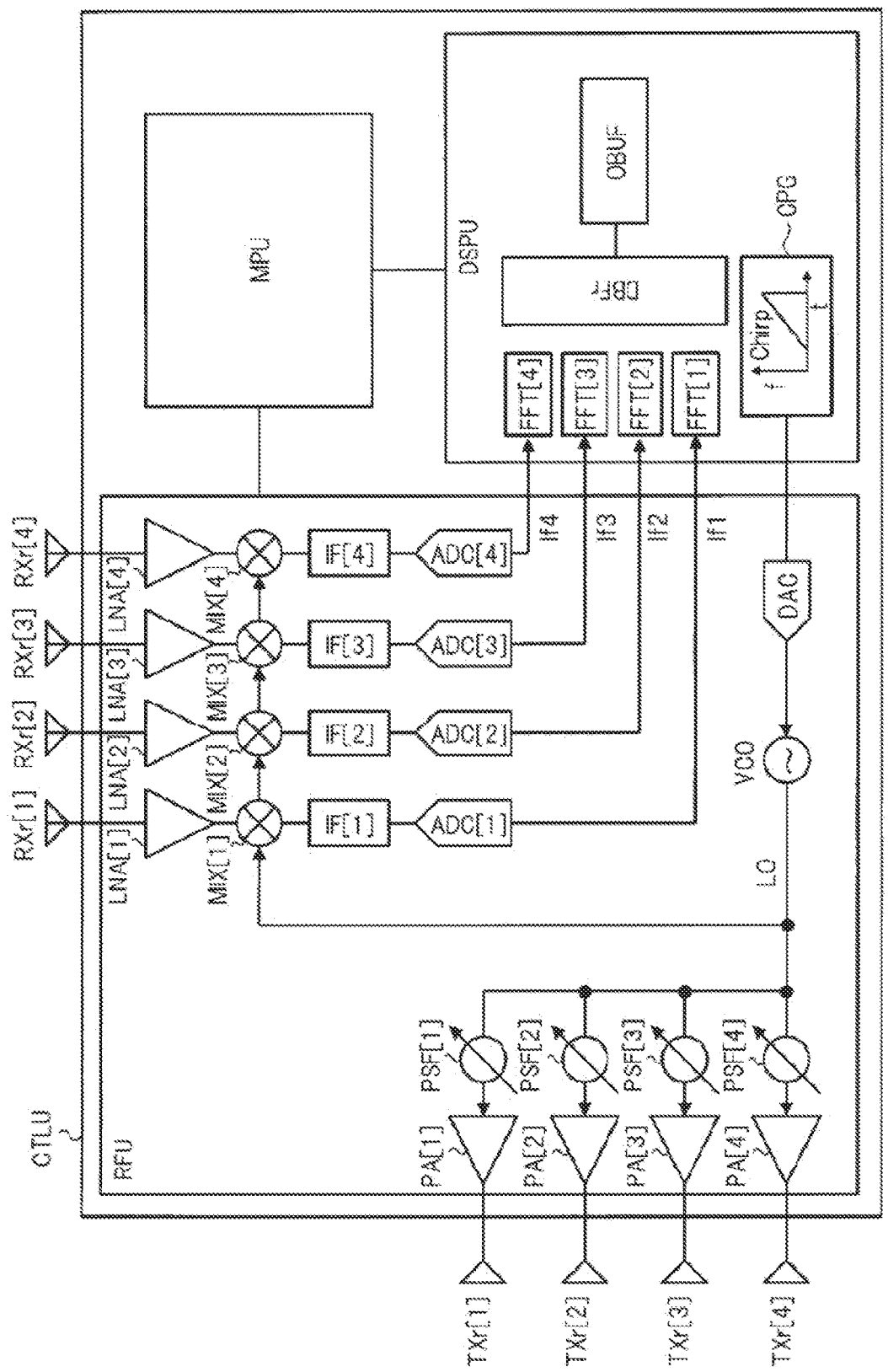
FIG. 5 is a circuit diagram showing an exemplary configuration of a main part of a control circuit in the electronic device of FIGS. 1A and 1B.
Figure 6:
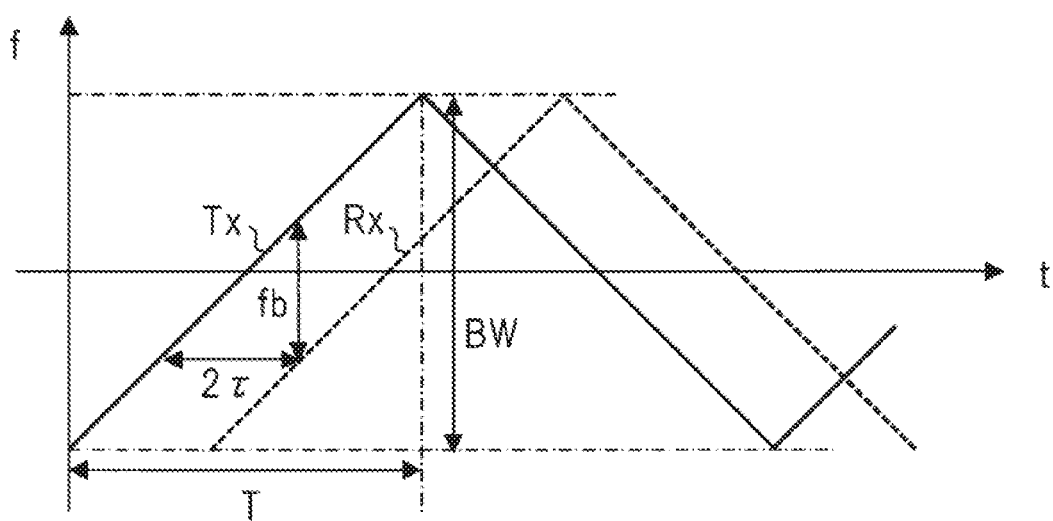
FIG. 6 is a conceptual diagram for explaining an exemplary process content in the FMCW system in FIG. 5.

FIG. 5 is a circuit diagram showing an exemplary configuration of a main part of a control circuit in the electronic device of FIGS. 1A and 1B. FIG. 6 is a conceptual diagram for explaining an exemplary process content in the FMCW system in FIG. 5, and the control circuit CTLU shown in FIG. 5 has a high frequency unit RFU, a processor unit MPU and a digital signal-processing unit DSPU. The high frequency unit RFU corresponds to the transmission wave outputting circuit TXOU and the reception wave inputting circuit RXIU of FIG. 2, and the digital signal processing unit DSPU corresponds to the transmission wave generating circuit TXGU and the reception wave processing circuit RXPU of FIG. 2. The processor unit MPU controls, for example, the entire control circuit CTLU.

The digital signal processor DSPU has a chirp signal generator CPG, a plurality of fast Fourier transform circuits FFT[1] to FFT[4], a receive beamformer DBFr, and an output buffer OBUF. The high frequency unit RFU has, as a transmission system circuit, a digital-to-analog converter DAC, a voltage controlled oscillator VCO, a plurality of phase shifters PSF[1] to PSF[4], and a plurality of power amplifiers PA[1] to PA[4]. The high frequency unit RFU has a plurality of low noise amplifiers LNA[1] to LNA[4], a plurality of mixers MIX[1] to MIX[4], a plurality of intermediate frequency processing circuits IF[1] to IF[4], and a plurality of analog-to-digital converters ADC[1] to ADC[4], as a receiving system circuit.

The chirp signal generator CPG generates, as a digital signal, a chirp signal whose frequency changes in proportion to time. The digital-to-analog converter DAC converts the digital chirp signal into an analog signal. The voltage controlled oscillator VCO frequency-modulates a local signal LO having a predetermined frequency, such as 79 GHz, based on the analog chirp signal. Each of the phase shifters PSF[1] to PSF[4] performs transmission beamforming in the elevation angle φ direction by appropriately controlling the phase of the modulated local signal LO. The control amount of the phase, i.e., the elevation angle c, is specified by, for example, the processor unit MPU or the like. The power amplifiers PA[1] to PA[4] amplify signals from the phase shifters PSF[1] to PSF[4], respectively, and output the amplified signals to the transmission antennas TXr[1] to TXr[4].

The low noise amplifiers LNA[1] to LNA[4] amplify reflected waves (received waves) received by the reception antennas RXr[1] to RXr[4], respectively. The mixers MIX[1] to MIX[4] multiply the signals from the low noise amplifiers LNA[1] to LNA[4] by the local signal LO from the voltage controlled oscillator VCO, respectively. The intermediate frequency processing circuits IF[1] to IF[4] perform a filtering processing, an amplifying processing, and the like on the signals from the mixers MIX[1] to MIX[4], respectively. The analog-to-digital converters ADC [1] to ADC[4] convert signals from the intermediate frequency processing circuits IF[1] to IF[4], respectively, into digital signals, thereby outputting IF signals If[1] to If[4].

The fast Fourier transform circuits FFT[1] to FFT[4] perform fast Fourier transform on the IF signals If[1] to If[4], respectively, to calculate the distance from the target object. Conceptually, as shown in FIG. 6, an IF signal (e.g., If[1]) has a beat frequency fb (=|Tx frequency-Rx frequency|) by multiplication of a transmission wave Tx (modulated local signal LO) by a mixer (MIX[1]) and a reception wave Rx. The transmission wave Tx is reflected by the target object, passes through a delay time of 2τ, and is received as a reception wave (reflected wave) Rx. The ratio between the period T of the chirp signal and the frequency modulation width BW is equal to the ratio between the delay time 2τ and the beat frequency fb. Therefore, in the FMCW system, the delay times 2τ are calculated the delay time 2τ by calculating the frequency of the IF signal, i.e., the beat frequencies fb, in addition to the distance to the target object is calculated.

Figure 7:
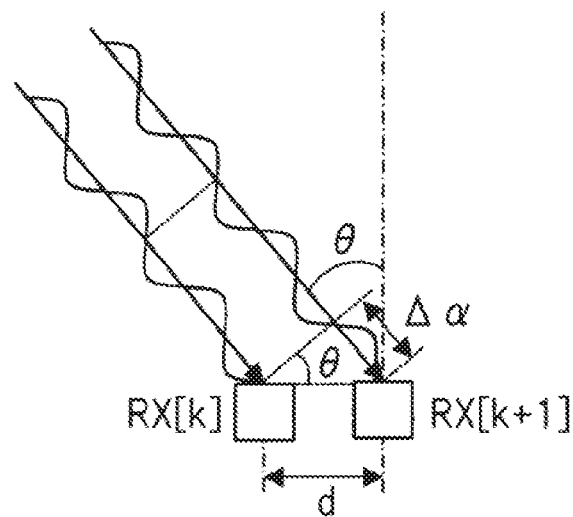
FIG. 7 is a conceptual diagram illustrating an example of processing contents of a reception beamformer in FIG. 5.

The reception beamformer DBFr calculates the azimuth angle θ at which the target exists based on the IF signals If[1] to If[4], and holds the calculation result in the output buffer OBUF. Conceptually, as shown in FIG. 7, the azimuth angle θ appears as a phase difference Δα between the IF signals If[1] to If[4]. The phase difference Δα is a value corresponding to the distance "d×sin θ" using the interval d between the adjacent reception antennas RX[p] and RX[p+1]. Therefore, the azimuth angle θ can be calculated by detecting the phase difference Do.

As a concrete system of the reception beamformer DBFr, a beamformer method, a Capon method, a linear predicting method, and the like are known.

Main Effect of the First Embodiment

The use of the first embodiment electronic device (radar device) typically enables a reduction in the number of antennas (while suppressing an increase in costs and the like) and a reduction in the processing (processing times, processing loads and the like) associated with radar search. In addition, it is possible to improve the S/N ratio.

Second Embodiment

<The Structure of the Electronic Device >

Figure 8:
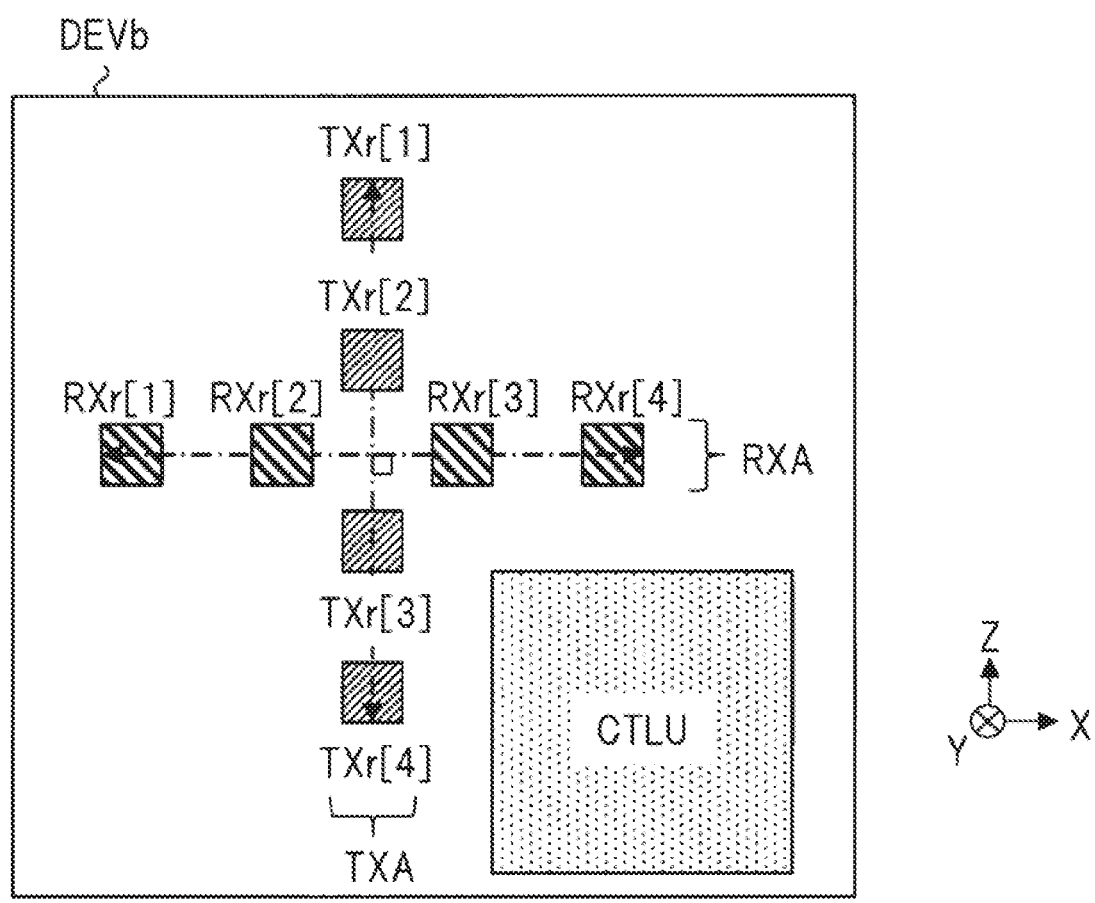
FIG. 8 is a plan view showing a schematic configuration of an electronic device according to an embodiment of the present second embodiment.

FIG. 8 is a plan view showing a schematic configuration of an electronic device according to an embodiment of the present second embodiment. In the electronic device (radar device) DEVb shown in FIG. 8, the transmitting linear array antenna TXA and the receiving linear array antenna RXA are arranged orthogonally as in the configuration of FIG. 1A. This orthogonal arrangement provides the same advantages as first embodiment. However, in the configuration example of FIG. 8, unlike the configuration example of FIG. 1A, the transmitting linear array antenna TXA and the receiving linear array antenna RXA are arranged in a cross shape (plus (+) shape). Further, the shape is not limited to a cross shape, and may be a T shape or the like.

In second embodiment, the Z direction in which the transmitting linear array antenna TXA is arranged intersects the X direction in which the receiving linear array antenna RXA is arranged. By flexibly arranging the transmitting linear array antenna TXA and the receiving linear array antenna RXA in this manner, for example, the layout design of a semiconductor chip or the layout design of a wiring board can be facilitated and made efficient as necessary.

Third Embodiment

<The Structure of the Electronic Device>

Figure 9:
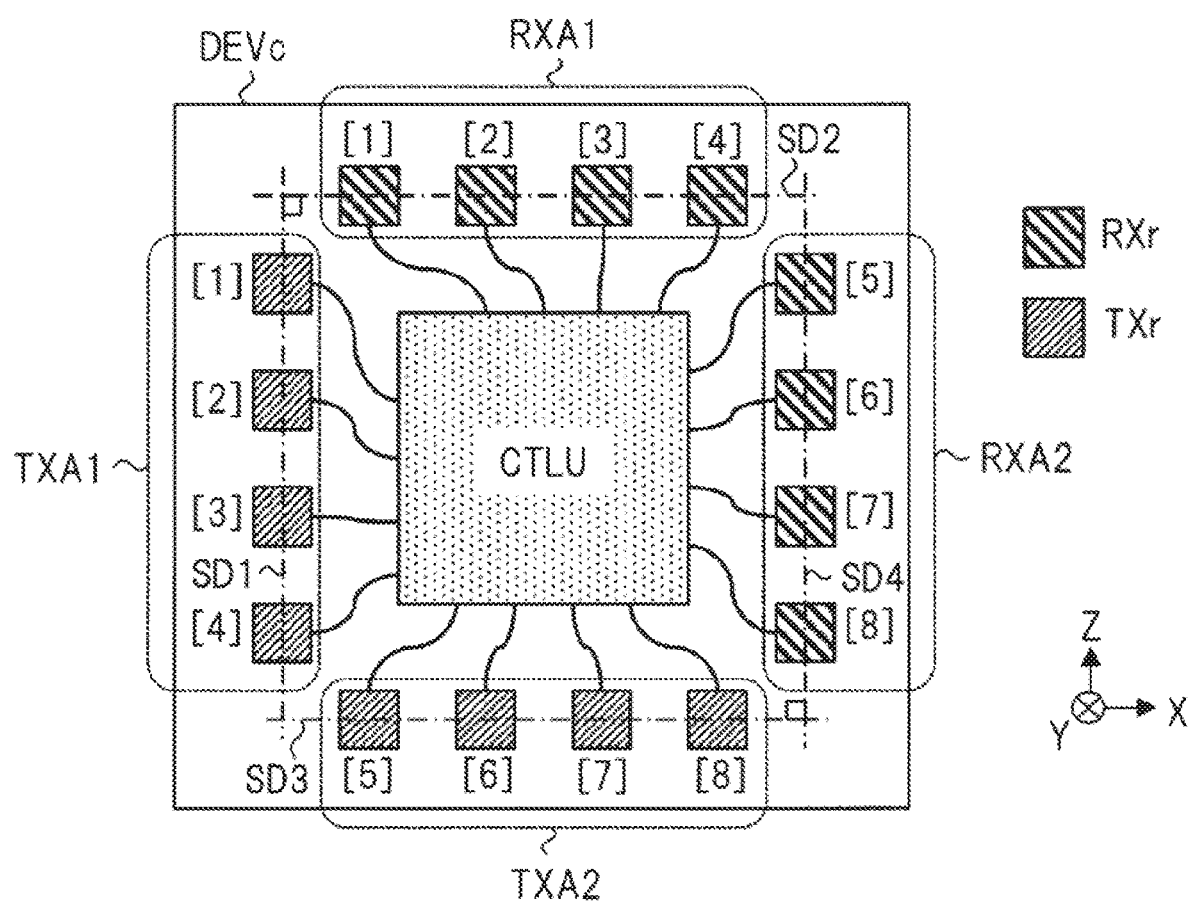
FIG. 9 is a plan view showing a schematic configuration of an electronic device according to an embodiment of the present third embodiment.

FIG. 9 is a plan view showing a schematic configuration of an electronic device according to an embodiment of the present third embodiment. The electronic device (radar device) DEVc shown in FIG. 9 includes two transmitting linear array antennas TXA1,TXA2 and two receiving linear array antennas RXA1,RXA2. Similar to the configuration of FIG. 1A, the transmitting linear array antenna TXA1 and the receiving linear array antenna RXA1 are arranged orthogonally, and the transmitting linear array antenna TXA2 and the receiving linear array antenna RXA2 are also arranged orthogonally.

Specifically, each of the two transmitting linear array antennas TXA1,TXA2 is arranged on a first side SD1, which is one of four sides forming a rectangular, and on a third side SD3 perpendicular to the first side SD1. The two receiving linear array antennas RXA1,RXA2 are respectively arranged on a second side SD2 facing the third side SD3 and on a fourth side SD4 facing the first side SD1.

This orthogonal arrangement provides the same advantages as first embodiment. Further, here, for example, the transmitting linear array antenna TXA1 and the receiving linear array antenna RXA1 are used as a first pair, and the transmitting linear array antenna TXA2 and the receiving linear array antenna RXA2 are used as a second pair. When the first pair is used, the directivity in the elevation angle c direction is obtained by the transmission beamforming, and the directivity in the azimuth angle θ direction is obtained by the receive beamforming, as described in first embodiment. Conversely, when the second pair is used, the directivity in the azimuth angle θ direction is obtained by the transmission beamforming, and the directivity in the elevation angle c direction is obtained by the reception beamforming.

For example, when the reception beamforming has a higher resolution than the transmission beamforming, the azimuth angle C is calculated with a high resolution by using the first pair, and the elevation angle φ is calculated with a high resolution by using the second pair. As described above, by appropriately using the first pair and the second pair using the configuration example of FIG. 9, it is possible to calculate the three-dimensional position of the target object with higher accuracy. Here, the arrangement relationship between the first pair and the second pair is an orthogonal arrangement relationship, but may not be an orthogonal arrangement relationship in some cases. That is, for example, it is also possible to perform radar search in a state in which the coordinate axis of the second pair is inclined with respect to the coordinate axis of the first pair.

Fourth Embodiment

<The Structure of the Electronic Device >

Figure 10:
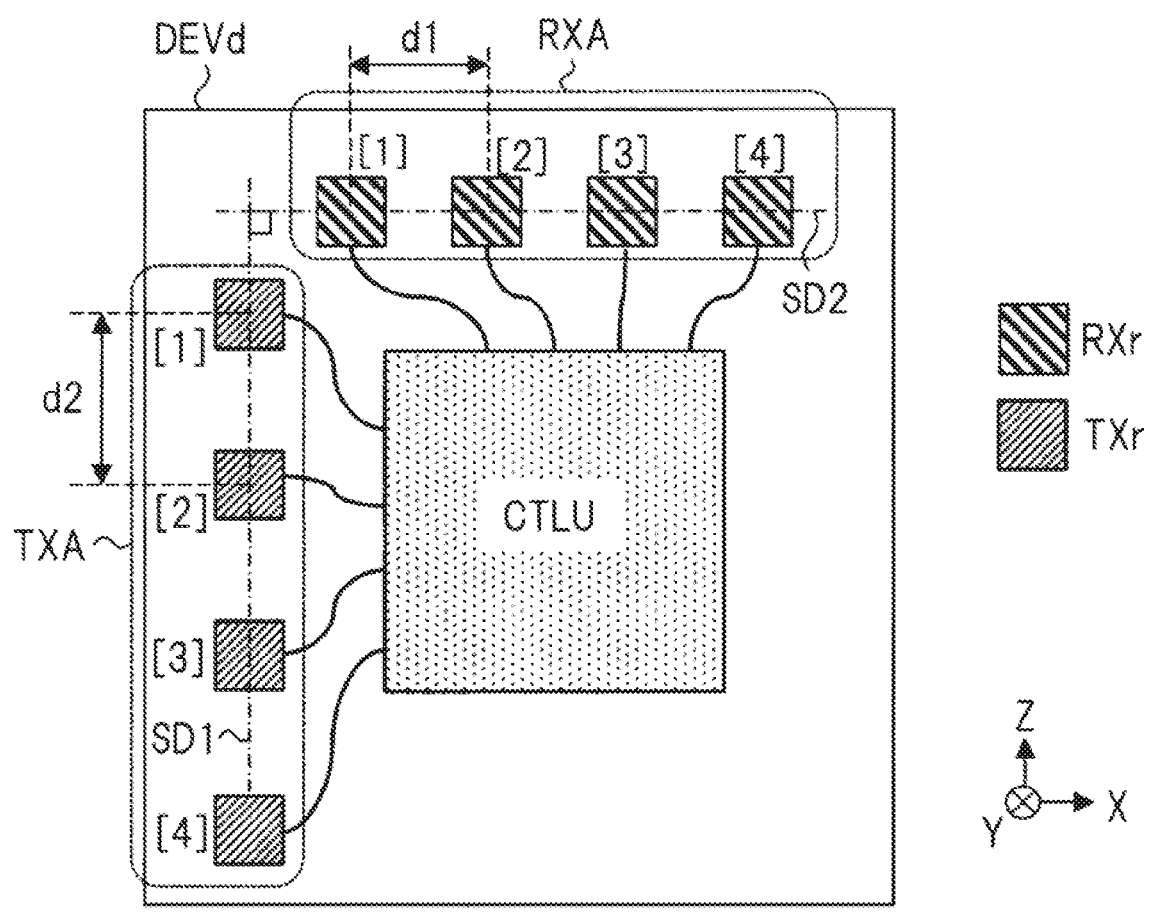
FIG. 10 is a plan view showing a schematic configuration of an electronic device according to an embodiment of the present fourth embodiment.

FIG. 10 is a plan view showing a schematic configuration of an electronic device according to an embodiment of the present fourth embodiment. In the electronic device (radar device) DEVd shown in FIG. 10, the transmitting linear array antenna TXA and the receiving linear array antenna RXA are arranged orthogonally as in the configuration of FIG. 1A. This orthogonal arrangement provides the same advantages as first embodiment. However, in the configuration example of FIG. 10, the interval d2 between the plurality of transmission antennas TXr[1] to TXr[4] included in the transmitting linear array antenna TXA is different from the interval d1 (e.g., d1<d2) in the case of FIG. 1A.

In the linear array antenna, the beam width of the main lobe shown in FIG. 12, the characteristics of the grating lobe generated by interference of radio waves in a cycle deviated from the cycle in which interference is originally desired, and the like are changed in accordance with the antenna interval. The interval between the transmission antennas TXr[1] to TXr[4](the same applies to the reception antennas RXr[1] to RXr[4]) can be appropriately optimized according to the characteristics of the linear array antenna to be obtained.

Although the invention made by the present inventor has been specifically described based on the embodiment, the present invention is not limited to the embodiment described above, and various modifications can be made without departing from the gist thereof.

What is claimed is:

1. An electronic device comprising:
   a rectangular area having i) a first side, ii) a second side orthogonal to the first side, iii) a third side orthogonal to the first side and opposite the second side, and iv) a fourth side orthogonal to both the second side and the third side and opposite the first side;
   a first pair of a first transmitting linear array antenna and a first receiving linear array antenna, wherein the first transmitting linear array antenna includes a plurality of first transmission antennas arranged along first side of the rectangular area and transmitting first transmission waves, wherein the first receiving linear array antenna includes a plurality of first reception antennas arranged along the second side of the rectangular area and receiving reflected waves of the first transmission waves;
   a second pair of a second transmitting linear array antenna and a second receiving linear array antenna, wherein the second transmitting linear array antenna includes a plurality of second transmission antennas arranged along the third side of the rectangular area and transmitting second transmission waves, wherein the second receiving linear array antenna includes a plurality of second reception antennas arranged along the fourth side of the rectangular area and receiving reflected waves of the second transmission waves; and
   a control circuit for controlling 1) the first pair of the first transmitting linear array antenna and the first receiving linear array antenna to obtain i) directivity in an elevation angle direction by transmission beamforming and ii) directivity in an azimuth angle direction by reception beamforming while controlling 2) the second pair of the second transmitting linear array antenna and the second receiving linear array antenna to obtain i) the directivity in the azimuth angle direction by the transmission beamforming and ii) the directivity in the elevation angle direction by the reception beamforming.

2. The electronic device as claimed in claim 1, wherein the plurality of first transmission antennas include a first transmit antenna and a second transmit antenna, the first transmit antenna and the second transmit antenna transmit a first transmit wave and a second transmit wave, respectively, in overlapping periods, and
   wherein the plurality of first reception antennas include a first receive antenna and a second receive antenna, and each of the first receive antenna and the second receive antenna receives a reflection wave of the first transmit wave and a reflected wave of the second transmit wave.

3. The electronic device as claimed in claim 2,
   wherein the control circuit calculates a distance to a target based on reflection waves of the first and second transmit waves received by the first and second receive antennas, and
   wherein the control circuit calculates the distance to the target without distinguishing whether the reflected wave corresponds to the first transmit wave or the reflected wave corresponds to the second transmit wave.

4. The electronic device as claimed in claim 1, wherein the transmitting linear array antenna and the receiving linear array antenna are arranged at positions other than intersections of the first side and the second side.

5. The electronic device as claimed in claim 1, wherein the control circuit electronically controls a direction of the first transmission wave transmitted by the first transmitting linear array antenna and a direction of the reflected wave received by the first receiving linear array antenna.

6. The electronic device as claimed in claim 1, wherein the transmitted wave is a millimeter wave or a quasi-millimeter wave.

7. A radar device comprising:
   a rectangular area having i) a first side, ii) a second side orthogonal to the first side, iii) a third side orthogonal to the first side and opposite the second side, and iv) a fourth side orthogonal to both the second side and the third side and opposite the first side;
   a first pair of a first transmitting linear array antenna and a first receiving linear array antenna, wherein the first transmitting linear array antenna includes a plurality of first transmission antennas arranged along the first side of the rectangular area and transmitting first transmission waves, wherein the first receiving linear array antenna includes a plurality of first reception antennas arranged along the second side of the rectangular area and receiving reflected waves of the first transmission waves;
   a second pair of a second transmitting linear array antenna and a second receiving linear array antenna, wherein the second transmitting linear array antenna includes a plurality of second transmission antennas arranged along the third side of the rectangular area and transmitting second transmission waves, wherein the second receiving linear array antenna includes a plurality of second reception antennas arranged along the fourth side of the rectangular area and receiving reflected waves of the second transmission waves; and
   a control circuit for controlling 1) the first pair of the first transmitting linear array antenna and the first receiving linear array antenna to obtain i) directivity in an elevation angle direction by transmission beamforming and ii) directivity in an azimuth angle direction by reception beamforming while controlling 2) the second pair of the second transmitting linear array antenna and the second receiving linear array antenna to obtain i) the directivity in the azimuth angle direction by the transmission beamforming and ii) the directivity in the elevation angle direction by the reception beamforming, wherein, in plan view, a line passing through one of the plurality of first transmission antennas and extending along a first direction parallel to the second side is a first imaginary line,
wherein, in plan view, a line passing through is one of the plurality of first reception antennas and extending along a second direction parallel to the first side is a second imaginary line, and
wherein a virtual reception antenna is created at a position intersecting the first imaginary line and the second imaginary line.

8. The radar device as claimed in claim 7,
wherein the plurality of first transmission antennas transmit the first transmission waves, respectively, in overlapping periods, and
wherein the control circuit performs a process of calculating a position of a target object with respect to the reflection wave received by the plurality of first reception antennas without distinguishing which one of the first transmission wave the reflected wave corresponds to.

9. The radar device as claimed in claim 7,
wherein the first transmitting linear array antenna and the first receiving linear array antenna are arranged at positions other than intersections of the first side and the second side, respectively.

10. The radar device as claimed in claim 7, wherein the transmitted wave is a millimeter wave or a quasi-millimeter wave.

11. A method for controlling a radar device, wherein the radar device comprises:
a rectangular area having i) a first side, ii) a second side orthogonal to the first side, iii) a third side orthogonal to the first side and opposite the second side, and iv) a fourth side orthogonal to both the second side and the third side and opposite the first side;
a first pair of a first transmitting linear array antenna and a first receiving linear array antenna, wherein the first transmitting linear array antenna includes a plurality of first transmission antennas arranged along the first side of the rectangular area, wherein the first receiving linear array antenna includes a plurality of first reception antennas arranged along the second side of the rectangular area;
a second pair of a second transmitting linear array antenna and a second receiving linear array antenna, wherein the second transmitting linear array antenna includes a plurality of second transmission antennas arranged along the third side of the rectangular area and transmitting second transmission waves, wherein the second receiving linear array antenna includes a plurality of second reception antennas arranged along the fourth side of the rectangular area and receiving reflected waves of the second transmission waves, and
wherein the method comprises:
transmitting, using the plurality of first transmission antennas arranged along the first side of the rectangular area, first transmission waves, respectively;
receiving, using the plurality of first reception antennas arranged along the second side of the rectangular area, reflected waves of the first transmission waves;
transmitting, using the plurality of second transmission antennas arranged along the third side of the rectangular area, second transmission waves, respectively; and
receiving, using the plurality of second reception antennas arranged along the fourth side of the rectangular area, reflected waves of the second transmission waves,
wherein the method further comprises controlling 1) the first pair of the first transmitting linear array antenna and the first receiving linear array antenna to obtain i) directivity in an elevation angle direction by transmission beamforming and ii) directivity in an azimuth angle direction by reception beamforming while controlling 2) the second pair of the second transmitting linear array antenna and the second receiving linear array antenna to obtain i) the directivity in the azimuth angle direction by the transmission beamforming and ii) the directivity in the elevation angle direction by the reception beamforming.

12. The method of claim 11,
wherein the plurality of first transmission antennas transmit the first transmission waves, respectively, in overlapping periods.

13. The method of claim 11, further comprising calculating a position of a target object with respect to the reflection wave received by the plurality of first reception antennas without distinguishing which one of the first transmission wave the reflected wave corresponds to.

14. The radar control method of claim 13, further comprising calculating a distance to the target based on the received reflected waves of the first and second transmission waves.

* * * * *